United States Patent
Reidhead et al.

(10) Patent No.: US 8,173,025 B2
(45) Date of Patent: *May 8, 2012

(54) WATER EVAPORATION DEVICE AND METHOD OF EVAPORATING WATER

(75) Inventors: J. Keith Reidhead, Moab, UT (US); Tyson P. Cox, Moab, UT (US)

(73) Assignee: ReformWater, LLC, Salt Lake City, UT (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/404,000

(22) Filed: Mar. 13, 2009

(65) Prior Publication Data

US 2010/0230057 A1 Sep. 16, 2010

(51) Int. Cl.
*B01D 37/00* (2006.01)

(52) U.S. Cl. ............. 210/767; 159/3; 159/4.4; 159/48.1

(58) Field of Classification Search ............... 159/3, 4.4, 159/48.1; 210/767
See application file for complete search history.

(56) References Cited

U.S. PATENT DOCUMENTS

| | | | |
|---|---|---|---|
| 2,904,263 A * | 9/1959 | Tate et al. ............. 239/494 |
| 4,323,424 A * | 4/1982 | Secunda et al. ........... 159/48.1 |
| 5,082,525 A | 1/1992 | Travis |
| 5,240,560 A | 8/1993 | Gregory |
| 5,335,728 A | 8/1994 | Strahan |
| 5,381,742 A | 1/1995 | Linton et al. |
| 5,582,680 A | 12/1996 | Vankouwenberg et al. |
| 6,190,498 B1 | 2/2001 | Blagborne |
| 6,200,428 B1 | 3/2001 | VanKouwenberg |
| 6,637,379 B2 | 10/2003 | Hays et al. |
| 7,251,939 B2 | 8/2007 | Walker |
| 2007/0227674 A1 | 10/2007 | Haslem et al. |
| 2007/0235146 A1 | 10/2007 | Haslem et al. |
| 2007/0246414 A1 | 10/2007 | Page et al. |

FOREIGN PATENT DOCUMENTS

| | | |
|---|---|---|
| JP | 6218357 | 8/1994 |
| JP | 7088469 | 4/1995 |
| JP | 2006007097 | 1/2006 |

OTHER PUBLICATIONS

CAC Product website. "High Output Quick Release Fittings". 2008. <http://www.compressedaircentre.ie/index.php?cPath=24>.*
Declaration of J. Keith Reidhead and Tyson P. Cox; May 13, 2009.

\* cited by examiner

*Primary Examiner* — Yelena G Gakh
*Assistant Examiner* — David Weisz
(74) *Attorney, Agent, or Firm* — Workman Nydegger (57) ABSTRACT

Water evaporation devices, systems and methods are used to evaporate large quantities of water from water impoundment ponds or other waste water sources. Water evaporation devices include a water evaporation barrel having an air acceleration chamber that creates venturi suction so as to draw water from a water source into a venturi chamber. Fast moving air and water create fine water droplets within a water atomization chamber, which droplets are then emitted from the water evaporation barrel through a discharge nozzle and into the air as a spray or cloud of fine water droplets. Water evaporation devices and associated systems and methods can be used to efficiently evaporate waster water produced by a wide variety of industrial processes.

20 Claims, 6 Drawing Sheets

WATER EVAPORATION DEVICE AND METHOD OF EVAPORATING WATER

BACKGROUND OF THE INVENTION

1. The Field of the Invention

The present invention relates to a water evaporation device and, more particularly, to a water evaporation device for use in a portable water evaporation system for large-scale evaporation of waste water from impoundment ponds and other industrial sources.

2. The Relevant Technology

There are many industrial processes which produce large quantities of water that cannot be legally discharged into rivers, other bodies of water, or onto the ground but must be impounded in evaporation ponds. Examples include waste water produced during the drilling of oil and gas wells, as a byproduct of extracting oil and gas (e.g., natural subsurface water or injected water), farm runoff (e.g., crop irrigation runoff, such as in the Imperial Valley in Calif., hog farm runoff, cattle farm runoff, and winery waste water), mine tailings wash runoff, mine process waste water (e.g., from gold mining, which water includes cyanide salts and acids), food processing waste water, sewage water, mineral reclamation evaporation ponds (e.g., to recover potash, soda ash, gypsum, magnesium and salt), and waste water discharged from mineral reclamation (e.g., alkaline water in trona ponds resulting from mining soda ash).

Waste water is produced in large quantities during drilling and extraction of natural gas and petroleum. Water is often used during well drilling, which produces contaminated waste water that must be impounded. Petroleum and gas reservoirs often contain edge water, which is natural subterranean water located near the hydrocarbon being extracted. In addition, many producers inject water into the ground (e.g., as a peripheral water drive) in order to drive the oil or gas toward producing wells within the periphery of water injectors. The amount of water extracted as a byproduct of gas or oil production is a fraction of the water cut. The water cut produced from oil and gas wells is typically separated from the oil or gas near the well head and stored in a holding tank. Because the water contains contaminants, it is typically hauled to a licensed impoundment facility for disposal in a lined evaporation pond.

Because evaporation of pond water is generally passive, impoundment ponds are typically very large, sometimes covering up to 50 acres or more to increase the rate of evaporation. The waste water contained in such ponds is often toxic. For these and other reasons, waste water evaporation ponds must generally be placed at remote locations, away from cities, roads, parks and other places where people are likely to congregate. Moreover, industrial waste water impoundments can attract and kill migratory birds and other wildlife. As a result, many locales ban the construction of large water impoundment ponds for environmental and/or safety reasons. For example, water produced at oil and gas wells in Colorado is often shipped to other locations for disposal, such as Utah, at a cost of about $10 to $12 for each barrel of water. About 100,000 barrels of waste water are currently shipped daily from Colorado to Utah, at a total cost of $1,000,000 or more per day.

BRIEF SUMMARY OF THE INVENTION

The present invention relates to water evaporation devices and associated water evaporation systems and methods which are used to evaporate large quantities of waste water. Examples of waste water sources include sources discussed above including, but not limited to, water produced during the drilling and extraction of oil and gas, farm runoff, mine tailings runoff, mine process water, food processing water, sewage, and water from mineral reclamation. The inventive water evaporation devices, systems and methods are able to process waste water using pressurized air to convert the water into fine water droplets, which are emitted into the air to promote evaporation.

According to one aspect of the invention, a water evaporation device is provided which includes a barrel having a hollow interior, an air input orifice at a receiving end for receiving pressurized air, an air acceleration chamber that receives and accelerates pressurized air through the barrel, a water input orifice through a side of the barrel, a venturi chamber through which the accelerated air passes in order to create a negative pressure that is able to draw water through the water input orifice and into the venturi chamber, a water atomization chamber into which pressurized air and water rapidly mix so as to form fine droplets of water, and a discharge orifice at a discharge end of the barrel through which air and fine water droplets are discharged. A spray nozzle or emitter may be attached at the discharge end of the barrel in order to emit a fine spray or cloud of water droplets above the water evaporation device. According to one embodiment, the emitter may comprise a spiral cone nozzle that is threadably coupled to the discharge orifice of the barrel.

The water evaporation device may further include means for releasably connecting the receiving end of the barrel to a pressurized air line. An example includes threads within the air input orifice configured to be threadably attached to a threaded nipple or pipe attached to a pressurized air line. Another example is a quick release coupler, such as quick release couplers known in the art for interconnecting pressurized air conduits or hoses.

The air acceleration chamber has a tapering diameter, moving from an input end to an exit end distal to the air input orifice, such that the air acceleration chamber at the exit end has a diameter that is substantially less than the diameter at the input end. The constricted air passageway causes air within the air acceleration chamber to speed up. In one embodiment, the air acceleration chamber can have a frusto-conical cross section extending between the input end and exit end. Alternatively, the air acceleration chamber can have a bell-shaped cross section extending between the input end and exit end. In yet another embodiment, the air acceleration chamber can have a stepped cross section. It will be appreciated that the air acceleration chamber can have other cross sectional designs or features so long as there is a constriction that accelerates pressurized air passing therethrough. The barrel may further include an air discharge passageway extending between the exit end of the air acceleration chamber and the venturi chamber.

The venturi chamber has a diameter that is significantly greater than the diameter of the exit end of the air acceleration chamber. In this way, fast moving air passing from the air acceleration chamber into the venturi chamber creates a suction or negative pressure that is able to draw water from a waste water source through a water line attached to the water input orifice and into the venturi chamber. From there, the fast moving pressurized air and water pass into the water atomization chamber. The atomization chamber generally has a diameter that is similar to that of the venture chamber. The pressurized air and water rapidly intermix and chum within the atomization chamber so as to form fine water droplets, which are emitted through the discharge end of the barrel as a fine spray or cloudy mist of water.

According to another aspect of the invention, a water evaporation device for use in evaporating water from a waste water source is provided that includes a barrel having a hollow interior, coupling means for releasably attaching the input end of the barrel to a pressurized air line, air acceleration means for accelerating air received into the barrel through the input end, a water input orifice disposed through a side of the barrel, water suction means for drawing water through the water input orifice and into the hollow interior of the barrel, and water atomization means for mixing water and fast moving air passing through the hollow interior of the barrel so as to form fine droplets of water. The device may also include spray means for directing fine droplets of water from the barrel into the air.

In another aspect of the invention, a water evaporation system for evaporating water from a waste water source includes a plurality of water evaporation devices as described herein, a pressurizable air line in fluid communication with the air input orifice of each water evaporation device, and a water line in fluid communication with the water input orifice of each water evaporation device. Passing pressurized air through the barrel of each water evaporation device creates a suction that draws water through a water line and into the venturi chamber. The pressurized air and water then pass into the water atomization chamber so as to form the fine droplets of water as described above, which are then emitted from each device as a fine spray or mist.

In another aspect of the invention, a method of evaporating water from a source of waste water is provided, such as water contained in an impoundment pond, water storage tank, or direct line from a source of industrial waste water. The method includes positioning a water evaporation system so that the water line of each water evaporation device is in fluid communication with a source of waste water, passing pressurized air through the pressurizable air line and into each water evaporation device, the pressurized air creating internal suction that draws water from the waste water source through the water line and into the venturi chamber, atomizing water within the atomization chamber of each water evaporation device, such as by mixing and churning of the pressurized air and water within the atomization chamber, and discharging a cloud or spray of fine water droplets out the distal discharge end of each water evaporation device.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to water evaporation devices and associated systems and methods for evaporating water from a waste water source. Although the water evaporation devices, systems and methods can be employed in a variety of different situations where it is desirable to evaporate a large quantity of water into the atmosphere, such as water from most any impoundment pond, the present invention is especially well suited for evaporating waste water generated by the oil and gas industry. The inventive water evaporation devices, systems and methods utilize pressurized air to (1) draw water by negative pressure or suction from an impoundment pond or other waste water source, (2) atomize the water by forming fine water droplets, and (3) discharging the fine water droplets into the air at high pressure as a fine spray, cloud, or mist to maximize the rate of evaporation. The inventive water evaporation devices, systems and method are highly efficient in evaporating large quantities of water.

Figure 1A:
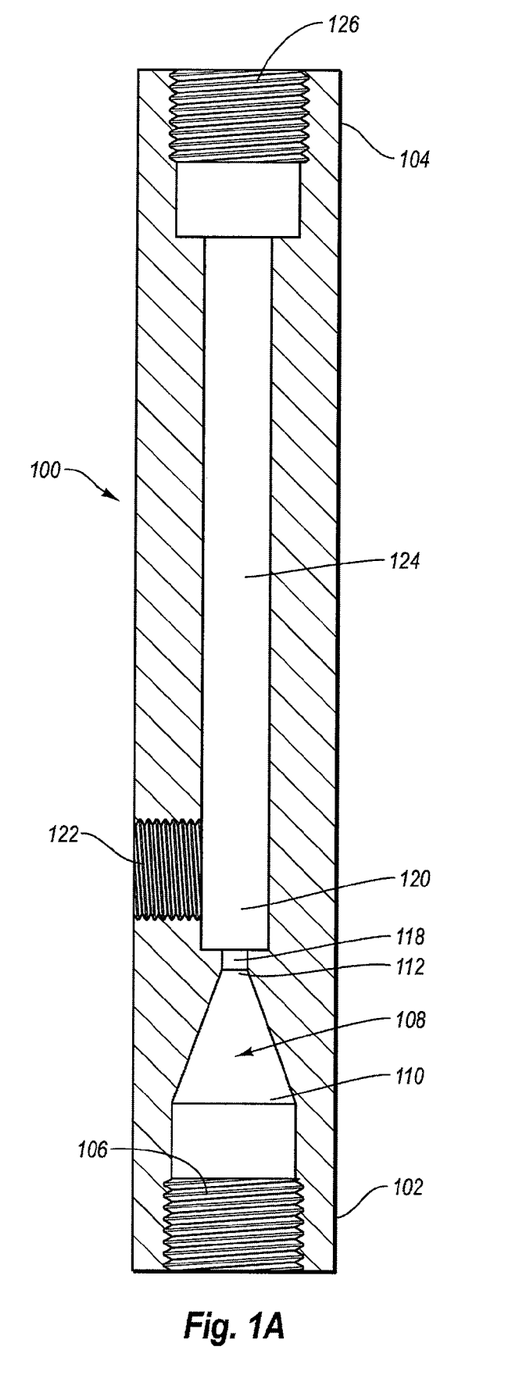
FIG. 1A is a cross-sectional view of an exemplary water evaporation device according to the invention.
Figure 1B:
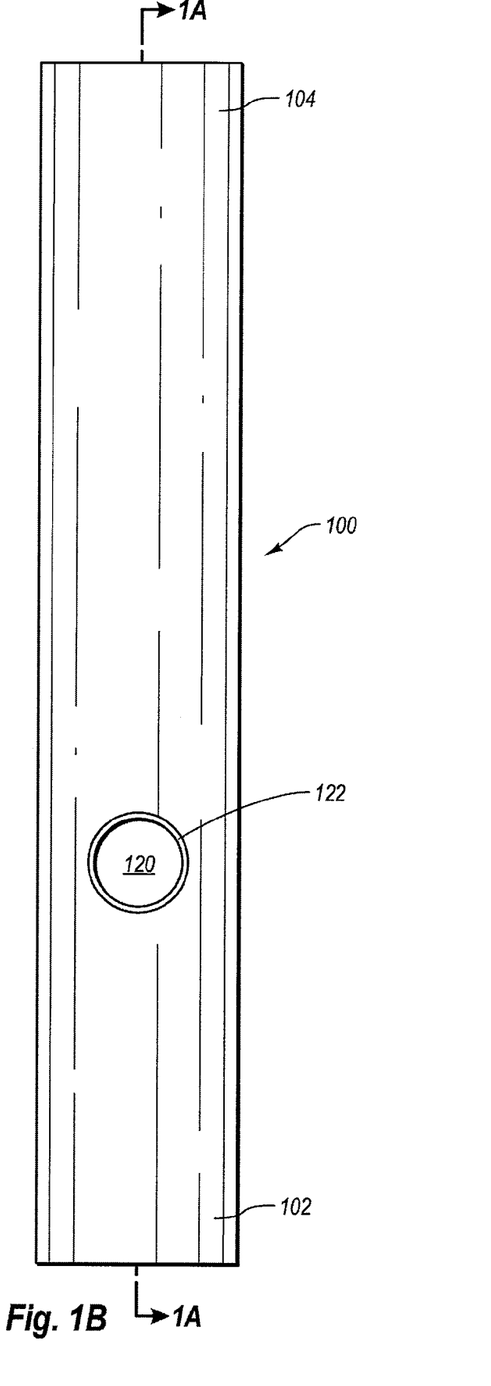
FIG. 1B is a side perspective view of the exemplary water evaporation device of FIG. 1A.

A first example of an inventive water evaporation device is illustrated in FIGS. 1A and 1B. The water evaporation device in this example includes a barrel 100 having a proximal receiving end 102, a distal discharge end 104, and a hollow interior extending between the proximal receiving end 102 and distal discharge end 104. The barrel 100 can have any desired outer diameter depending on the desired size of the water evaporation device. According to one embodiment, the barrel 100 can have a diameter in a range of about 1-3 inches, e.g., about 1-½ inch. As will be discussed below, by passing pressurized air through the hollow interior of the barrel 100, water is drawn into the barrel 100 by suction, atomized to form fine water droplets, and then discharged out the distal discharge end as a fine mist or spray.

Barrel 100 includes an air input orifice 106 at the proximal receiving end 102. The air input orifice can have any desired diameter depending on the size of the water evaporation device. According to one embodiment, the air input orifice can have a diameter of about 1 inch, for example when the barrel 100 has an outer diameter of about 1-½ inch. It may be advantageous for the air input orifice 106 to have a diameter corresponding to standard pipe sizes. As illustrated in FIG. 1A, the air input orifice 106 is threaded so as to provide means for coupling the receiving end 102 of the water evaporation barrel 100 to a pressurized air line (see FIG. 1C), such as by means of a threaded nipple attached to the pressurized air line. Such threads are an example of coupling means for attaching the barrel 100 to a pressurized air line, more particularly for attaching the barrel 100 to a nipple attached to the pressurized air line. Other examples of coupling means include quick release couplers known in the art. It will be appreciated that any means known in the art for coupling two pipes together may be used as the coupling means according to the invention.

In fluid communication with the air input orifice 106 is an air acceleration chamber 108. The air acceleration chamber 108 includes an input end 110 and an exit end 112. The air acceleration chamber 108 is tapered so as to become narrower going from the input end 110 to the exit end 112. This constricts the air flow pathway and causes the pressurized air to accelerate. In this embodiment, the air acceleration chamber 108 is illustrated as being frustoconical, or having a truncated cone-shaped cross section. It will be appreciated, however, that air acceleration chamber 108 can have any design in which the air flow pathway is constricted so to accelerate air moving from the input end 110 toward and through the exit end 112. For example, the air acceleration chamber 108 can alternatively be bell shaped. It may be stepped, such as by tiny concentric circular steps that decrease in diameter moving from the input end 110 to the exit end 112. Any shape that includes a constriction for accelerating air through the hollow interior of the barrel 100 is an example of air acceleration means.

The overall dimensions of the air acceleration chamber 108, including the input end 110 and exit end 122, typically depend on the overall size of the water evaporation device. According to one embodiment, such as when the input orifice 106 has a diameter of about 1 inch, the diameter of the air acceleration chamber 108 at input end 110 may also be about 1 inch, and the diameter of the air acceleration chamber 108 at exit end 112 can be about 1/16 to about 1/4 inch, e.g., about 3/32 inch. In general, the diameter of the input end 110 at least about 100% greater than the diameter of the exit end 112, preferably at least about 150% greater, more preferably at least about 200% greater, and most preferably at least about 300% greater.

As illustrated in FIG. 1A, positioned distally just beyond the exit end 112 of air acceleration chamber 108 is an air discharge passageway 118. Air discharge passageway 118 may have the same or similar diameter as exit end 112 of air acceleration chamber 108. The air discharge passageway 118 can be relatively short, such as less than about 75% of the length of the air acceleration chamber 108, preferably less than about 50%.

Air discharge passageway 118 is interposed between and fluidly interconnects air acceleration chamber 108 with venturi chamber 120, which has a diameter greater than the exit end 112 of air discharge passageway 118 and air discharge passageway 118 in order to create a negative pressure within the venturi chamber 120. In general, the diameter of the venturi chamber 120 will be at least about 100% greater than the diameter of the exit end of the air acceleration chamber.

A water input port or orifice 122 is positioned through a sidewall of barrel 100 and is in fluid communication with the venturi chamber 120. The water input orifice 122 can be threaded in order to provide coupling means for connecting the water evaporation barrel 100 to a water line such as, for example, a line positioned or submerged beneath the surface of a waste water impoundment pond. The diameter of the water input orifice 122 generally depends on the overall size of the water evaporation device. According to one example, such as when the barrel 100 has an outer diameter of about 1-½ inch, the water input orifice 122 can have a diameter of about ¾ inch, preferably about ½ inch.

Negative pressure within the venturi chamber 120 produced by fast moving air passing therethrough causes water to be drawn into the venturi chamber 120 through the water input port 122 by suction or negative pressure. Venturi chamber 120 is therefore an example of water suction means for drawing water into the hollow interior of the barrel 100.

Distal to the venturi chamber 120, and in fluid communication therewith, is a water atomization chamber 124. The diameter and length of the water atomization chamber are generally dependent on the size of the water evaporation device. According to one embodiment, such as when the barrel 100 has an out diameter of about 1-½ inch, the water atomization chamber 124 can have a diameter of about ½ inch. In general, the diameter of the water atomization chamber 124 will be at least about 100% greater than the diameter of the exit end 112 of the air acceleration chamber 108.

The water atomization chamber 124 typically has a length at least about 20% of the length of the hollow interior of the barrel 100, preferably at least about 30%, and more preferably at least about 50% of the length of the hollow interior of the barrel 100. In the case where water is drawn or suctioned into the hollow interior of barrel 100 by means of venturi chamber 120, rather than by using pressurized water, the length of water atomization chamber 124 is generally shorter. In the case where the outer diameter of the barrel 100 is about 1-½, the water atomization chamber 124 can have a length of about 2-½ inches.

Pressurized air and water from the venturi chamber 120 enter the water atomization chamber 124 at great speed and turbulence, causing churning and rapid intermixing, thereby forming fine droplets of water. The water atomization chamber 124 is an example of water atomization means for producing small droplets of water within the hollow interior of the barrel 100.

Distal to the water atomization chamber 124 is a discharge orifice 126 at the distal discharge end 104 of the barrel 100. The discharge orifice 126 can be threaded in order to provide coupling means for coupling the distal discharge end 104 of the barrel 100 to a spray nozzle. It will be appreciated that the spray nozzle may comprise any spray nozzle known in the art for emitting a spray or cloud of water into the air. According to one embodiment, such as when the barrel 100 has an outer diameter of about 1-½ inch, the discharge orifice 126 can have a diameter of about 1 inch. It may be advantageous for the discharge orifice 126 to have a diameter corresponding to standard spray nozzle sizes.

Figure 1C:
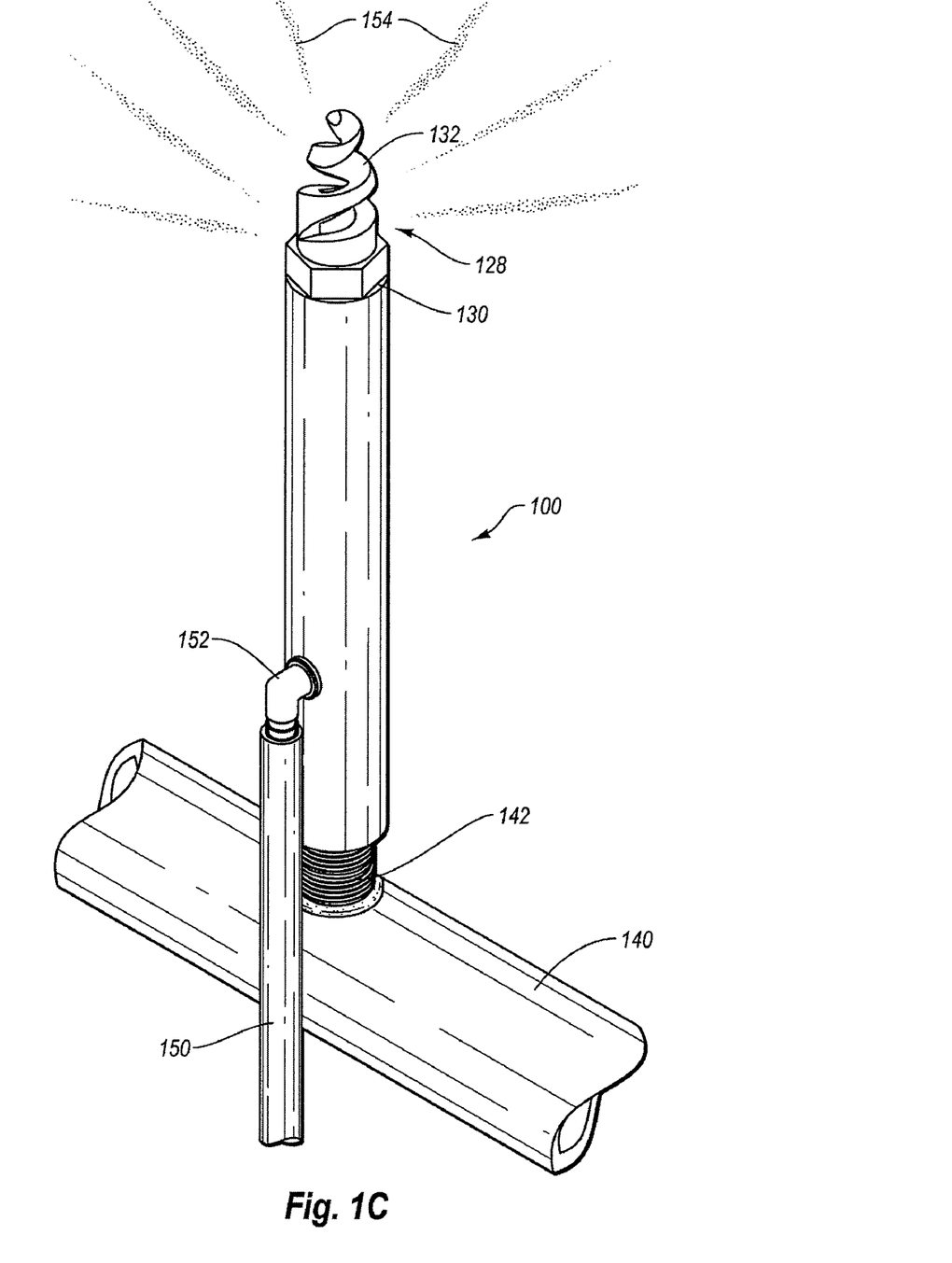
FIG. 1C is a perspective view of the exemplary water evaporation device Of FIGS. 1A and 1B connected to air and water lines and emitting a fine spray of water.

As illustrated in FIG. 1 C, which is a perspective view of the water evaporation barrel 100 of FIGS. 1A and 1B used in combination with a pressurizable air line 140 and a water line 150, the spray nozzle may comprise a spiral cone nozzle 128. Spiral cone nozzle 128 includes a threaded coupling end 130 that can be threadably coupled to the threaded discharge orifice 126 and a corkscrew discharge end 132 that emits a spray or a cloud of fine water droplets in a desired pattern above or external to the barrel 100. Spiral cone nozzle 128 is an example of spray means for creating a desired spray pattern of fine water droplets above or external to the barrel 100. It will be appreciated, however, that any sprayer or sprinkler known in the art may comprise the spray means.

Barrel 100 is attached to the pressurizable air line 140 by means of a nipple 142. The nipple 142 includes threads so as to threadably couple with the threaded air input orifice 106 of barrel 100. The nipple 142 can be attached to pressurizable air line 140 using any desired means, such as by welding, threaded engagement, or other attachment means known in the art.

The water line 150 is attached to barrel 100, more particularly to the water input port 122, by means of a threaded nipple 152. The water line 150 may be attached to nipple 152 using any appropriate means known in the art, an example of which is a barbed sleeve (not shown) inserted within the water line 150, as is commonly used when connecting flexible sprinkler tubing to a nipple or tubing joint.

In use, pressurized air from the pressurizable air line 140 is forced through the hollow interior of water evaporation barrel 100, which draws water by suction through the water line 150 and into the water atomization chamber 124, which causes churning or thorough mixing of the water and pressurized air so as to form fine droplets of water, which are emitted through the discharged nozzle 128 as a fine spray or mist of atomized water 154.

Figure 2:
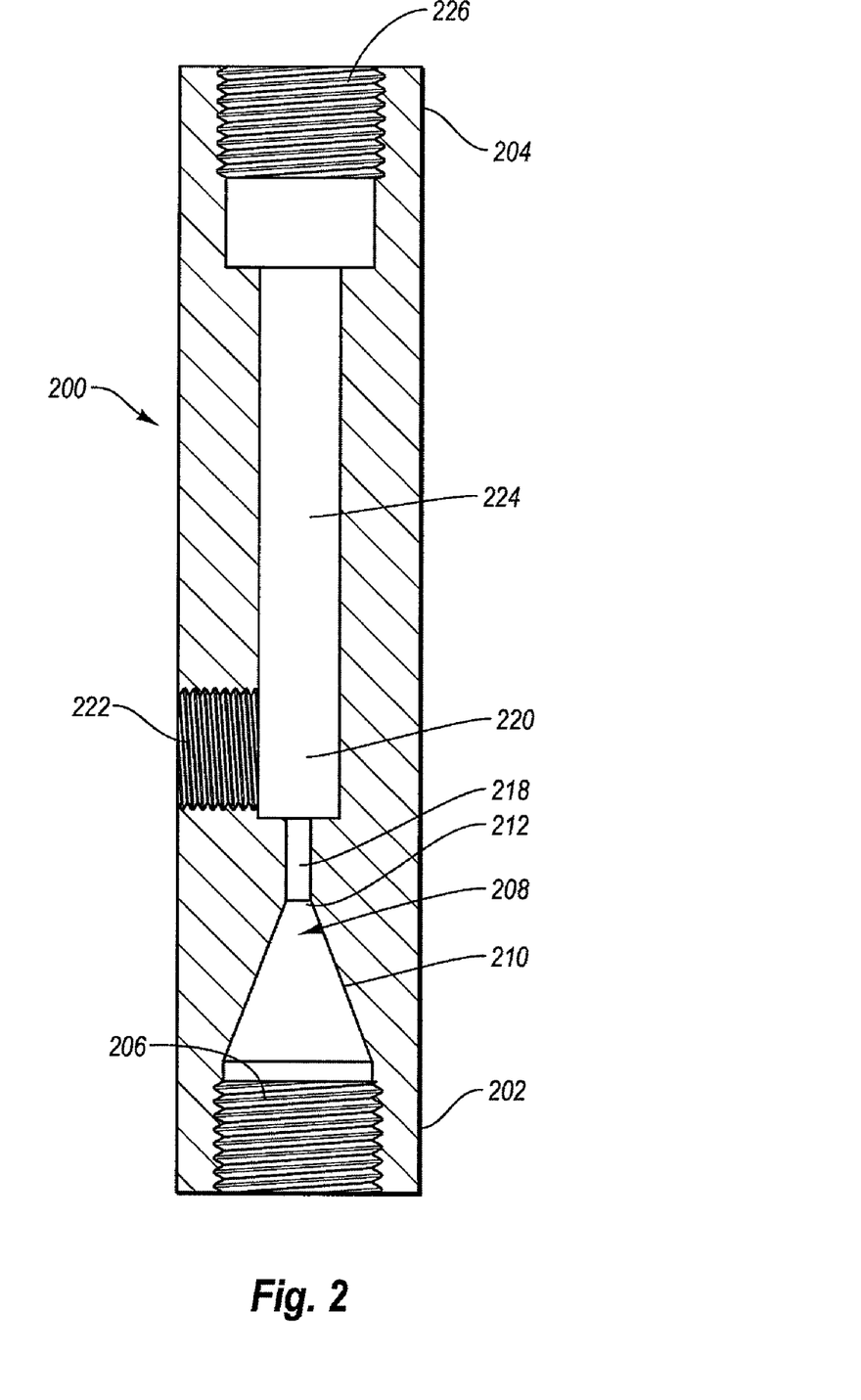
FIG. 2 is a cross-sectional view of another exemplary water evaporation device according to the invention.

A second example of an inventive water evaporation device is illustrated in FIG. 2. The water evaporation device in this example is similar to the one illustrated in FIGS. 1A-1C and has been shown to work well in evaporating water from a natural gas well impoundment pond using suction to draw the water into the hollow interior of the device. The water evaporation device of FIG. 2 includes a barrel 200 having a proximal receiving end 202, a distal discharge end 204, and a hollow interior extending between the proximal receiving end 202 and distal discharge end 204. Barrel 200 further includes an air input orifice 206 at proximal receiving end 202 which is threaded to provide means for coupling the receiving end 202 to a nipple attached to a pressurized air line (see FIG. 1C).

In fluid communication with air input orifice 206 is a tapered air acceleration chamber 208, which includes an input end 210 and an exit end 212. An air discharge passageway 218 is provided, which interconnects exit end 212 with a venturi chamber 220. Venturi chamber 220 has a diameter greater than exit end 212 and air discharge passageway 218 in order to create a negative pressure within the venturi chamber 120. A threaded water input orifice 222 is positioned through a sidewall of barrel 200 and is in fluid communication with the venturi chamber 220. Negative pressure within venturi chamber 220 causes water to be drawn into venturi chamber 220 through water input port 222 by suction or negative pressure.

Distal to the venturi chamber 220, and in fluid communication therewith, is a water atomization chamber 224. Pressurized air and water from venturi chamber 220 enter water atomization chamber 224 and form fine droplets of water.

Distal to water atomization chamber 224 is a threaded discharge orifice 226 at the distal discharge end 204 of barrel 200. Threaded discharge orifice 226 provides coupling means for releasably coupling the distal discharge end 204 of barrel 200 to a spray nozzle.

Figure 3A:
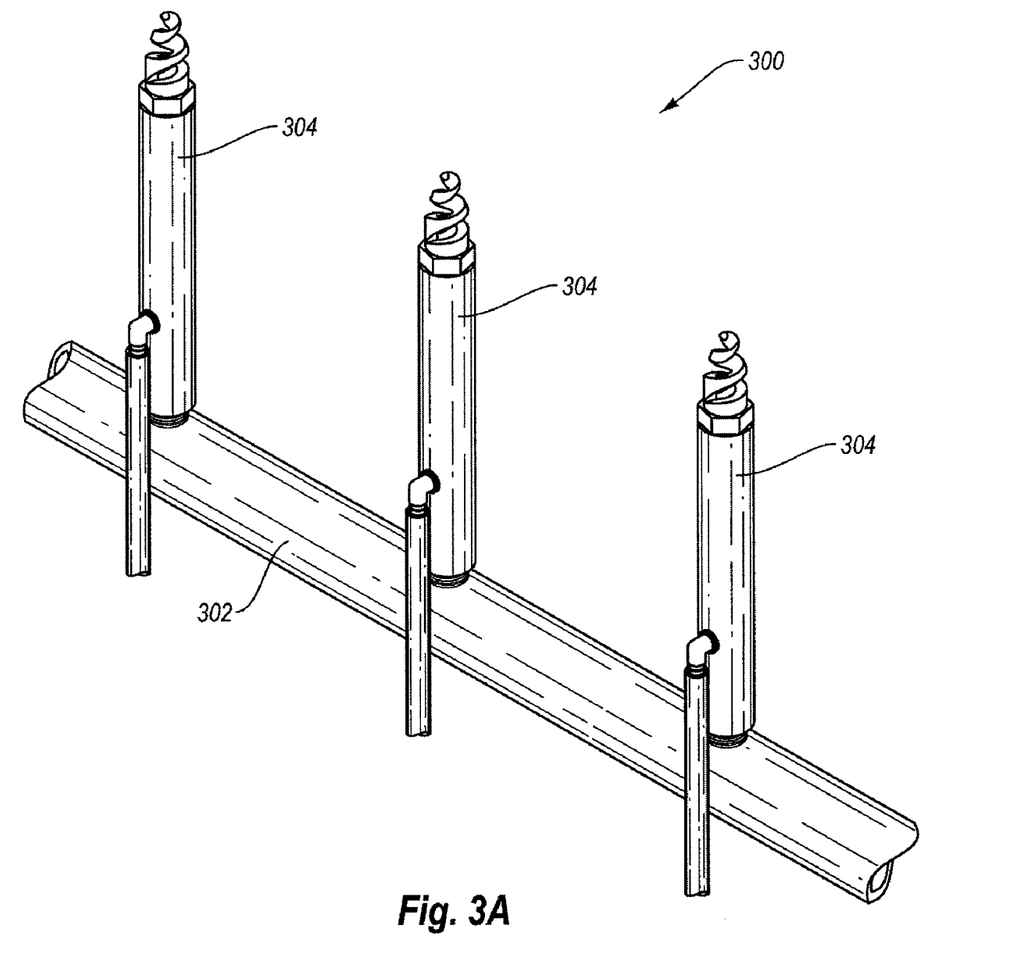
FIG. 3A illustrates an exemplary water evaporation system in which multiple water evaporation devices are aligned in a single row along a pressurized air line.

According to another embodiment, a water evaporation system may be provided that utilizes a plurality of water evaporation devices or barrels as disclosed herein. As shown in FIG. 3A, a water evaporation system 300 is provided that includes a pressurizable air line 302 coupled to a plurality of water evaporation devices 304, such as those illustrated in FIGS. 1 and 2 above. In this embodiment, the water evaporation devices 304 are aligned in parallel fashion along the top of pressurizable air line 302 so as to provide a single row of water evaporation devices 304.

Figure 3B:
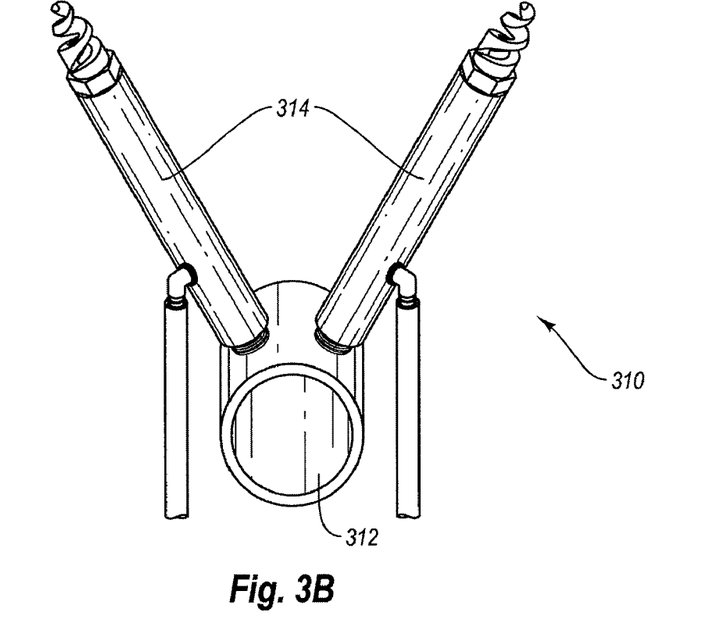
FIG. 3B illustrates an exemplary water evaporation system in which a pair of water evaporation devices connected to a pressurized air line are angled relative to each other and disposed on opposite sides of the pressurized air line.

FIG. 3B illustrates an alternative embodiment of a water evaporation system 310 according to the invention. Water evaporation system 310 includes a pair of water evaporation devices 314 connected close together but positioned so as to project outwardly from pressurizable air line 132 at different angles. In this way, the water evaporation devices spray water into the air on opposite sides of the pressurizable air line 312.

Figure 3C:
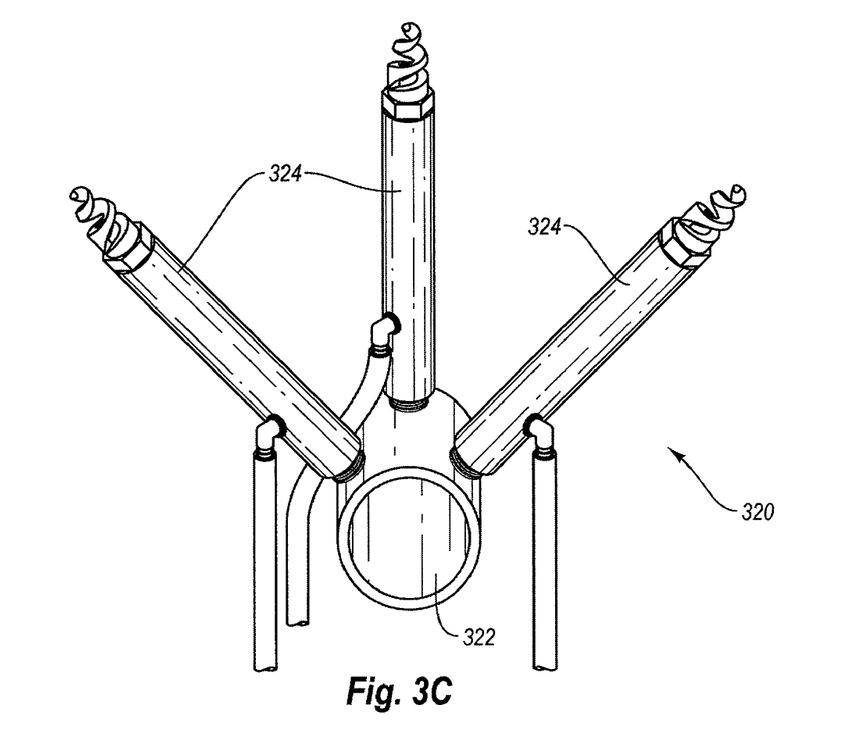
FIG. 3C illustrates an exemplary water evaporation system in which three water evaporation devices are connected to a pressurized air line at different angles.

FIG. 3C shows yet another embodiment of a water evaporation system 320 according to the invention. Water evaporation system 320 includes a pressurizable air line 322 and three water evaporation devices 304 positioned close together, one of which extends upward, and two of which are offset at side angles in order to emit water in three different directions relative to pressurized air line 322.

Figure 4:
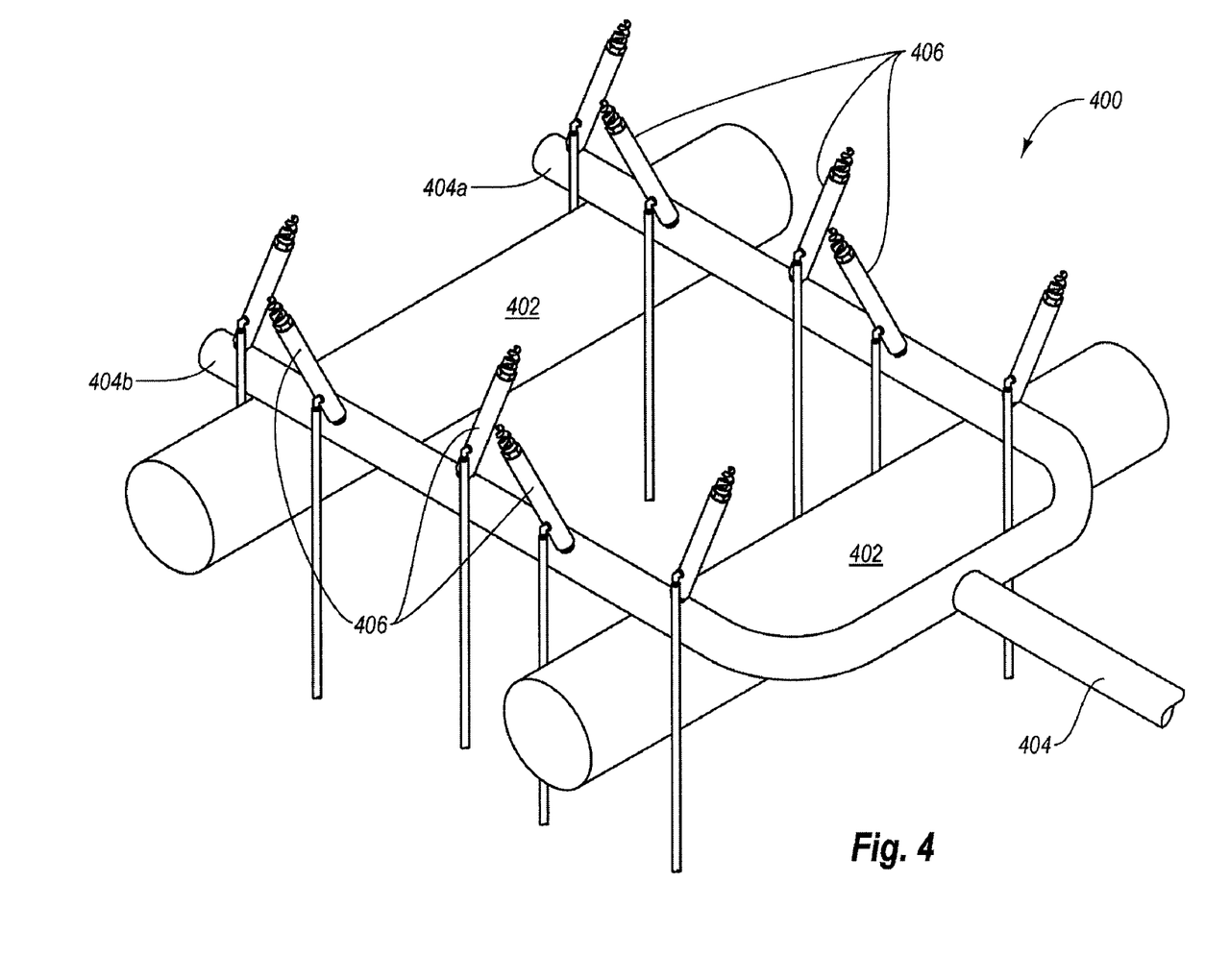
FIG. 4 illustrates an exemplary water evaporation system designed to float on top of an impoundment pond and which includes a branched pressurized air line with multiple water evaporation devices attached in staggered fashion alone each air line branch.

FIG. 4 illustrates a portable water evaporation system 400 that is designed to float on top of a water impoundment pond (not shown). The floating water evaporation system 400 includes a pair of pontoons 402 that are designed to float atop a water pond much like a pontoon boat. Attached to the pontoons 402 is a pressurizable air line 404, which is divided into a first branch 404a and a second branch 404b. Attached to each air line branch 404a, 404b, are a plurality of water evaporation devices 406. As shown in FIG. 4, the water evaporation devices 406 are staggered by alternating angles relative to air lines 404a, 404b. This configuration provides greater separation between the individual clouds of fine water droplets in order to maximize evaporation and minimize collision and aggregation of fine water droplets into larger water drops that can fall back to the pond.

Any of the foregoing water evaporation devices and systems can be used to evaporate water from a source of waste water, such as an impoundment pond, water storage tank, or direct line from a source of industrial waste water. One method according to the invention includes (1) positioning a water evaporation system in order for the water line of each of a plurality of water evaporation devices is in fluid communication with a source of waste water, (2) passing pressurized air through the pressurizable air line(s) and into each of the plurality of water evaporation devices, wherein the pressurized air passing through the venturi chamber creates internal suction that draws water from the waste water source through the water line and into the venturi chamber, (3) atomizing the water within the atomization chamber of each water evaporation device by mixing and churning the pressurized air and water within the atomization chamber, and (4) discharging a cloud or spray of fine water droplets out the, distal discharge end of each water evaporation device. The rate at which water is evaporated using the inventive water evaporation devices, systems and methods is generally dependent on the number and spacing of water evaporation devices, the air temperature, altitude, and water temperature.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A water evaporation device for use in evaporating water from a waste water source, comprising:
   a barrel having an outer wall and a hollow interior extending longitudinally between a proximal receiving end and a distal discharge end;
   an air input orifice at the proximal receiving end of the barrel for receiving pressurized air within the hollow interior of the barrel;
   an air acceleration chamber forming part of the hollow interior of the barrel and that is in fluid communication with and positioned downstream from the air input orifice, the air acceleration chamber having an input end proximal to the air input orifice and an exit end distal to the air input orifice, the exit end having a diameter that is less than a diameter of the input end;

a water input orifice disposed through a side of the outer wall of the barrel downstream from the air acceleration chamber and that is in fluid communication with the hollow interior;

a venturi-water atomization chamber forming part of the hollow interior of the barrel, wherein the venturi-water atomization chamber is in fluid communication with and positioned downstream from the air acceleration chamber, wherein the venturi-water atomization chamber comprises:

a venturi region having a diameter greater than the diameter of the exit end of the air acceleration chamber and that is adjacent to the water input orifice for drawing water through the water input orifice and into the venturi-water atomization chamber during use;

a water atomization region adjacent to and downstream from the venturi region; and a discharge orifice at the distal discharge end of the barrel through which air and water from the water atomization region are discharged during use.

2. A water evaporation device as in claim 1, further comprising means for releasably connecting the proximal receiving end to a pressurizable air line.

3. A water evaporation device as in claim 2, the means for releasably connecting the proximal receiving end to a pressurizable air line comprising threads within at least a portion of the air input orifice for threadable attachment to a threaded nipple attached to a pressurizable air line.

4. A water evaporation device as in claim 2, the means for releasably connecting the proximal receiving end to a pressurizable air line comprising a quick-release coupler.

5. A water evaporation device as in claim 1, the air acceleration chamber having a frustoconical cross section extending between the input end and the exit end.

6. A water evaporation device as in claim 1, the air acceleration chamber having a bell-shaped or stepped cross section extending between the input end and the exit end.

7. A water evaporation device as in claim 1, the diameter of the input end of the air acceleration chamber being at least about 100% greater than the diameter of the exit end.

8. A water evaporation device as in claim 1, the diameter of the input end of the air acceleration chamber being at least about 150% greater than the diameter of the exit end.

9. A water evaporation device as in claim 1, the diameter of the input end of the air acceleration chamber being at least about 200% greater than the diameter of the exit end.

10. A water evaporation device as in claim 1, the diameter of the input end of the air acceleration chamber being at least about 300% greater than the diameter of the exit end.

11. A water evaporation device as in claim 1, the hollow interior further comprising an air discharge passageway extending between the exit end of the air acceleration chamber and the venturi region.

12. A water evaporation device as in claim 1, the venturi region and the water atomization region both having a diameter that is greater than the diameter of the exit end of the air acceleration chamber.

13. A water evaporation device as in claim 1, the water atomization region having a length that is at least about 20% of the length of the hollow interior of the barrel.

14. A water evaporation device as in claim 1, the water atomization region having a length that is at least about 30% of the length of the hollow interior of the barrel.

15. A water evaporation device as in claim 1, the water atomization region having a length that is at least about 50% of the length of the hollow interior of the barrel.

16. A water evaporation device as in claim 1, further comprising an emitter attached at the distal discharge end of the barrel and in fluid communication with the water atomization region.

17. A water evaporation device as in claim 16, the emitter comprising a spiral cone nozzle threadably coupled to the discharge orifice of the barrel.

18. A water evaporation device for use in evaporating water from a waste water source, comprising:

a barrel having an outer wall and a hollow interior extending longitudinally between a proximal receiving end and a distal discharge end;

coupling means for releasably attaching the proximal receiving end of the barrel to a pressurizable air line;

air acceleration means, within the hollow interior of the barrel and downstream from the proximal receiving end, for accelerating air received into the barrel through the proximal receiving end;

a water input orifice disposed through a side of the outer wall of the barrel downstream from the air acceleration means and in fluid communication with the hollow interior of the barrel;

water suction means, within the hollow interior of the barrel downstream from the air acceleration means and in fluid communication with the water input orifice, for drawing water through the water input orifice and into the hollow interior of the barrel;

water atomization means, within the hollow interior of the barrel and positioned between the water suction means and the distal discharge end, for mixing water and fast moving air passing through the hollow interior of the barrel so as to form fine droplets of water; and spray means, at the distal discharge end of the barrel, for directing fine droplets of water from the barrel into the air above the barrel.

19. A method of evaporating water from a source of waste water comprising:

providing a water evaporation device comprising:

a barrel having an outer wall and a hollow interior extending longitudinally between a proximal receiving end and a distal discharge end;

an air input orifice at the proximal receiving end of the barrel for receiving pressurized air within the hollow interior of the barrel;

an air acceleration chamber forming part of the hollow interior of the barrel and that is in fluid communication with and positioned downstream from the air input orifice, the air acceleration chamber having an input end proximal to the air input orifice and an exit end distal to the air input orifice, the exit end having a diameter that is less than a diameter of the input end;

a water input orifice disposed through a side of the outer wall of the barrel downstream from the air acceleration chamber and that is in fluid communication with the hollow interior;

a venturi-water atomization chamber forming part of the hollow interior of the barrel, wherein the venturi-water atomization chamber is in fluid communication with and positioned downstream from the air acceleration chamber, wherein the venturi-water atomization chamber comprises:

a venturi region having a diameter greater than the diameter of the exit end of the air acceleration chamber and that is adjacent to the water input orifice for drawing water through the water input orifice and into the venturi-water atomization chamber during use;

a water atomization region adjacent to and downstream from the venturi region; and a discharge orifice at the distal discharge end of the barrel through which air and water from the water atomization region are discharged during use;

placing the water evaporation device in fluid communication with the source of waste water;

introducing pressurized air into the air acceleration chamber through the air input orifice of the barrel;

drawing water from the source of waste water through the water input orifice and into the venturi region as a result of suction created by the pressurized air passing from the air acceleration chamber through the venturi region;

atomizing water within the water atomization region; and discharging a cloud or spray of fine water droplets out the distal discharge end of the barrel.

20. A water evaporation device for use in evaporating water from a waste water source, comprising:

a barrel having an outer wall and a hollow interior extending longitudinally between a proximal receiving end and a distal discharge end;

an air input orifice at the proximal receiving end of the barrel for receiving pressurized air within the hollow interior of the barrel;

an air acceleration chamber forming part of the hollow interior of the barrel and that is in fluid communication with and positioned downstream from the air input orifice, the air acceleration chamber having an input end proximal to the air input orifice and an exit end distal to the air input orifice, the input end having a diameter at least about 100% greater than a diameter of the exit end;

a water input orifice disposed through a side of the outer wall of the barrel downstream from the air acceleration chamber and that is in fluid communication with the hollow interior;

a venturi-water atomization chamber forming part of the hollow interior of the barrel, wherein the venturi-water atomization chamber is in fluid communication with and positioned downstream from the air acceleration chamber, wherein the venturi-water atomization chamber has a diameter that is greater than the diameter of the exit end of the air acceleration chamber and comprises:

a venturi region chamber adjacent to the water input orifice for drawing water through the water input orifice and into the venturi-water atomization chamber during use;

a water atomization region adjacent to and downstream from the venturi region and having a length that is at least about 20% of the length of the hollow interior of the barrel;

a discharge orifice at the distal discharge end of the barrel; and a spiral cone nozzle coupled to the discharge orifice through which air and water from the water atomization chamber are discharged during use.

* * * * *